United States Patent [19]

O'Hagan et al.

[11] Patent Number: 5,581,658

[45] Date of Patent: Dec. 3, 1996

[54] ADAPTIVE SYSTEM FOR BROADCAST PROGRAM IDENTIFICATION AND REPORTING

[75] Inventors: Michael O'Hagan; Nadia K. O'Hagan, both of LaJolla; Frank E. Hines, San Diego, all of Calif.

[73] Assignee: Infobase Systems, Inc., Rancho Palo Verdes, Calif.

[21] Appl. No.: 167,646

[22] Filed: Dec. 14, 1993

[51] Int. Cl.⁶ .................................................. G06F 15/18
[52] U.S. Cl. .................................... 395/22; 395/2.41
[58] Field of Search ........................... 395/22, 24, 2.41

[56] References Cited

U.S. PATENT DOCUMENTS

| | | | |
|---|---|---|---|
| 3,810,156 | 5/1974 | Goldman | 340/347 |
| 4,230,990 | 10/1980 | Lert, Jr. et al. | 455/67 |
| 4,450,531 | 5/1984 | Kenyon et al. | 364/604 |
| 4,677,466 | 6/1987 | Lert, Jr. et al. | 358/84 |
| 4,697,209 | 9/1987 | Kiewit et al. | 358/84 |
| 4,739,398 | 4/1988 | Thomas et al. | 358/84 |
| 4,857,999 | 8/1989 | Welsh | 358/84 |
| 5,019,899 | 5/1991 | Boles et al. | 358/84 |
| 5,220,640 | 6/1993 | Frank | 395/22 |
| 5,306,893 | 4/1994 | Morris et al. | 395/22 |
| 5,308,915 | 5/1994 | Ohya et al. | 395/22 |
| 5,381,513 | 1/1995 | Tsuboka | 395/2.41 |
| 5,402,519 | 3/1995 | Inoue et al. | 395/22 |
| 5,426,745 | 6/1995 | Baji et al. | 395/22 |

FOREIGN PATENT DOCUMENTS

| | | | |
|---|---|---|---|
| 0210609A3 | 2/1987 | European Pat. Off. | H04H 1/00 |
| 0510632A3 | 10/1992 | European Pat. Off. | |
| 2559002 | 8/1985 | France | H04B 1/00 |

*Primary Examiner*—George B. Davis
*Attorney, Agent, or Firm*—Bruce W. Greenhaus

[57] ABSTRACT

A computer-implemented method and system for monitoring, identifying, classifying and logging musical work performance broadcasts over the public airwaves. The system uses a neural network to classify specially-processed "retinal" signatures of the musical work performance. The neural network is trained for each musical work using a single noise-biased retinal sample of the spectral distribution of preselected dynamic features of the corresponding audio signal. A detection decision is made at the neural network output using fuzzy logic circuitry to compare results of predetermined thresholding. The system of this invention fully automates the real-time identification of broadcast musical work performances.

13 Claims, 13 Drawing Sheets

FUZZY DECISION LOGIC

ADAPTIVE SYSTEM FOR BROADCAST PROGRAM IDENTIFICATION AND REPORTING

BACKGROUND OF THE INVENTION

1. Field of the Invention

This invention relates generally to methods and apparatus for identifying broadcast programs and particularly to the automatic identification and reporting of broadcast performances of musical works, commercials and the like.

2. Discussion of the Related Art

The broadcast industry requires accurate monitoring and reporting of broadcast programming for a variety of economic purposes. Advertising revenues are often computed as a direct function of audience numbers estimated by means of broadcast program monitoring systems. Commercial advertising revenue also depends on the number of commercial repetitions and the precise commercial broadcast day, hour and minute. Licensing revenues are computed based on the number of broadcast performances of the underlying work, such as a musical recording, movie or syndicated feature program.

There are many systems known in the art for identifying and verifying the broadcast performances of various works, whether commercials, musical works or feature works. These systems can be broadly characterized as manual and automated.

Manual monitoring and reporting systems require human operators to review recorded broadcast signals, to recognize and identify each broadcast performance and to log the work identification and the broadcast date and time. Even with the assistance of computer-implemented logging and reporting systems, such manual monitoring schemes are labor-intensive and therefore very expensive to operate. Moreover, reliance on manual techniques introduces an uncontrollable source of error in the resulting broadcast performance reports.

Automated monitoring and reporting systems for broadcast programming can be broadly characterized as cooperative and unilateral. Cooperative electronic monitoring systems rely on special coding signals embedded in the broadcast programming for accurate recognition and identification of individual works.

Cooperative systems that detect identification signals embedded in the broadcast signal require the cooperation of the broadcasters, who must encode the broadcast of each program for such systems to be effective. Because of financial conflicts-of-interest between the broadcaster and the advertiser or licensor, any cooperative monitoring and reporting system that relies on broadcaster cooperation introduces uncontrollable credibility problems in the monitoring reports.

In U.S. Pat. No. 4,857,999, Russell J. Welsh discloses a broadcast commercial monitoring system that identifies commercials by detecting closed-caption characters and extracting identifiable signatures therefrom. Welsh's system is intended to verify commercial broadcast frequency for advertising billing purposes and relies on the closed-caption signal for the hearing-impaired that is embedded in the commercial for purposes other than cooperative broadcast monitoring. Because this embedded signal is easily decoded into a series of digital characters, Welsh's system provides accurate identification without extensive computational effort. However, Welsh neither considers nor discusses the problem of identifying performances of musical works or the like that do not include such embedded signals.

In recent years, completely automatic unilateral broadcast signal identification systems have been disclosed that require no special coding of the broadcast signal. These unilateral monitoring systems rely on signal processing techniques to extract a "signature" from the broadcast signal for use in identification of the broadcast work by comparing it to a predetermined library of signatures.

For instance, in U.S. Pat. No. 3,810,156, Robert N. Goldman discloses a signal identification system that uses a concise digital "signature" developed by accumulating several broadcast signal samples. Although Goldman's system does not require embedded code signals, he merely suggests converting each two seconds of broadcast signal into a single digital number and neither considers nor suggests techniques for overcoming the inherent inaccuracies of such a technique, preferring to rely on the supposed benefits of aggregation over many samples.

In U.S. Pat. No. 4,739,398, William L. Thomas et al. discloses a system for recognizing broadcast segments such as commercials by applying continuous pattern recognition to signals derived from the broadcast signal representing strategically-selected regions of each video frame. Similarly to Goldman. Thomas et al. extract a signature using a parameter mask and consult a library for comparison and identification. They do not suggest means for overcoming the inherent inaccuracies of such comparison methods introduced by errors arising from mismatched timing, loss of synchronization and random noise.

In U.S. Pat. No. 4,450,531, Stephen C. Kenyon et al. disclose a broadcast signal recognition system and method that obtains signal correlation of a plurality of reference and broadcast signal segments. Kenyon et al. teach that signal disturbances such as noise bursts or dropout can be overcome by relying on a test for coincidence between many separate signal portions and reference signals. However, Kenyon et al. require very substantial signal processing resources to handle the multiple cross-correlations of broadcast signal segments required for their technique, and do not suggest effective means for overcoming problems introduced by program truncation and timing errors.

In U.S. Pat. No. 4,230,990, John G. Lert, Jr. et al. disclose a broadcast program identification system that extracts signatures responsive to either a natural or inserted "cue" and then compares the signature with a large library for identification. In U.S. Pat. No. 4,677,466, Lert et al. improve on the earlier identification system by extracting a signature responsive to a finding of "stability" in the signal as determined by comparing "events" in sequence. These events include such things as the signal blanking indicating a switch to commercial and the like. Their system is disclosed as shown in FIG. 1 herein where the improvement is the comparison of subsequent events to determine a stability condition, thereby eliminating the requirement for embedded cues. In U.S. Pat. No. 4,697,209, David A. Kiewit et al. disclose the application of the Lert, Jr. et al. technique to in-home monitoring of television viewer activity by means of a local system that monitors all program viewing in the home, whether received via broadcast or produced in a local video cassette player. Neither Lert et al. nor Kiewit et al. suggest how to overcome the inherent inaccuracies of their methods arising from errors introduced in the broadcast signal that hinder accurate comparison of other "signatures" with the corresponding library reference signals.

Single and multiple reference segment signal identification systems can theoretically operate effectively where ideal signal conditions prevail, but such systems are relatively ineffective under typical broadcast operational conditions. For example, with intermittent signal dropout, a single segment correlation may be severely degraded and thereby result in failure to indicate correspondence of the broadcast and reference signals when correspondence does in fact exist. Measures intended to accommodate such intermittent errors can introduce unacceptable levels of "false" identification of the target work.

With broadcast music programs, speed variations between the same musical work played by different broadcast stations may be so extreme that even the use of sub-audio techniques known in the art for single reference segment systems give inadequate performance. Known broadcast signal identification systems cannot cope effectively with substantial music speed variations. It has been found that disk jockeys, to create desired effect, are quite likely to vary recording playback speeds to control playback duration time and to segue into and out of a popular musical work, thereby omitting portions of the recording at the beginning and end. Even under ideal conditions, signal processing methods that rely on simple linear cross-correlation techniques introduce high "false alarm" identification rates that reduce overall monitoring and logging system performance to less than 60% effectiveness. Even the most effective of such systems requires enormous processing power and very large signature library storage capacity, thereby making such systems disadvantageously expensive.

Accordingly, there is a clearly-felt need in the art for a broadcast performance monitoring and reporting system that can provide reports of the time and date of actual broadcast performances of identified works, such as recorded music, commercials and the like with substantially improved effectiveness at substantially reduced cost. The related unresolved problems and deficiencies are clearly felt in the art and are solved by our invention in the manner described below.

SUMMARY OF THE INVENTION

Our broadcast performance monitoring system solves many of the above problems by combining improved reference sampling techniques and a new "retinal" sample architecture with neural network training and recognition procedures and a fuzzy logic decision method. Our monitoring system is made "adaptive" by using a noisy reference sample to "train" a neural network to recognize a performance of each of many target works. Each performance sample is obtained by filtering out selected steady-state components of the performance to emphasize the "dynamic" features of the musical work. These dynamic musical features are then organized into a series of retinal samples each having an architecture suitable for "recognition" by a trained neural network. Recognition output signals are evaluated by fuzzy logic to obtain the most probable musical work identification, and the results are stored in a logging system.

It is an object of our invention to provide an automated method, apparatus and system for monitoring and logging broadcast performances of musical works and the like that does not rely on the insertion of special codes or on synchronization with predictable cues in the broadcast signal. It is an advantage of our system that a neural network trained with a single retinal sample selected from the intermediate portion of a musical work performance provides high recognition over all portions of that musical work. This feature arises from the unexpectedly advantageous observation that the dynamic elements of a musical performance, when organized into a "retinal" sample architecture, from a characteristic pattern that is recognizable throughout the entire performance of a particular musical work.

It is another object of our system to provide continual real-time reports of broadcast performances of musical works and the like efficiently and economically without resorting to supercomputers or expensive data storage facilities. It is an advantage of our system that real-time monitoring and identification of musical works can be accomplished using hardware as simple as a Macintosh computer modified by the addition of inexpensive digital signal processing cards and a Quad-Transputor neural network.

It is yet another object of our system to provide broadcast performance identification reliability of 90% or better. It is a feature of the system of our invention that high identification rates are achieved without high "false alarm" rates through predetermined thresholding and fuzzy-logic decision techniques.

The foregoing, together with other objects, features and advantages of our invention, will become more apparent when referring to the following specification, claims and the accompanying drawing.

BRIEF DESCRIPTION OF THE DRAWING

For a more complete understanding of our invention, we now refer to the following detailed description of the embodiments as illustrated in the accompanying drawing wherein.

DESCRIPTION OF THE PREFERRED EMBODIMENT

The Prior Art

Figure 1:
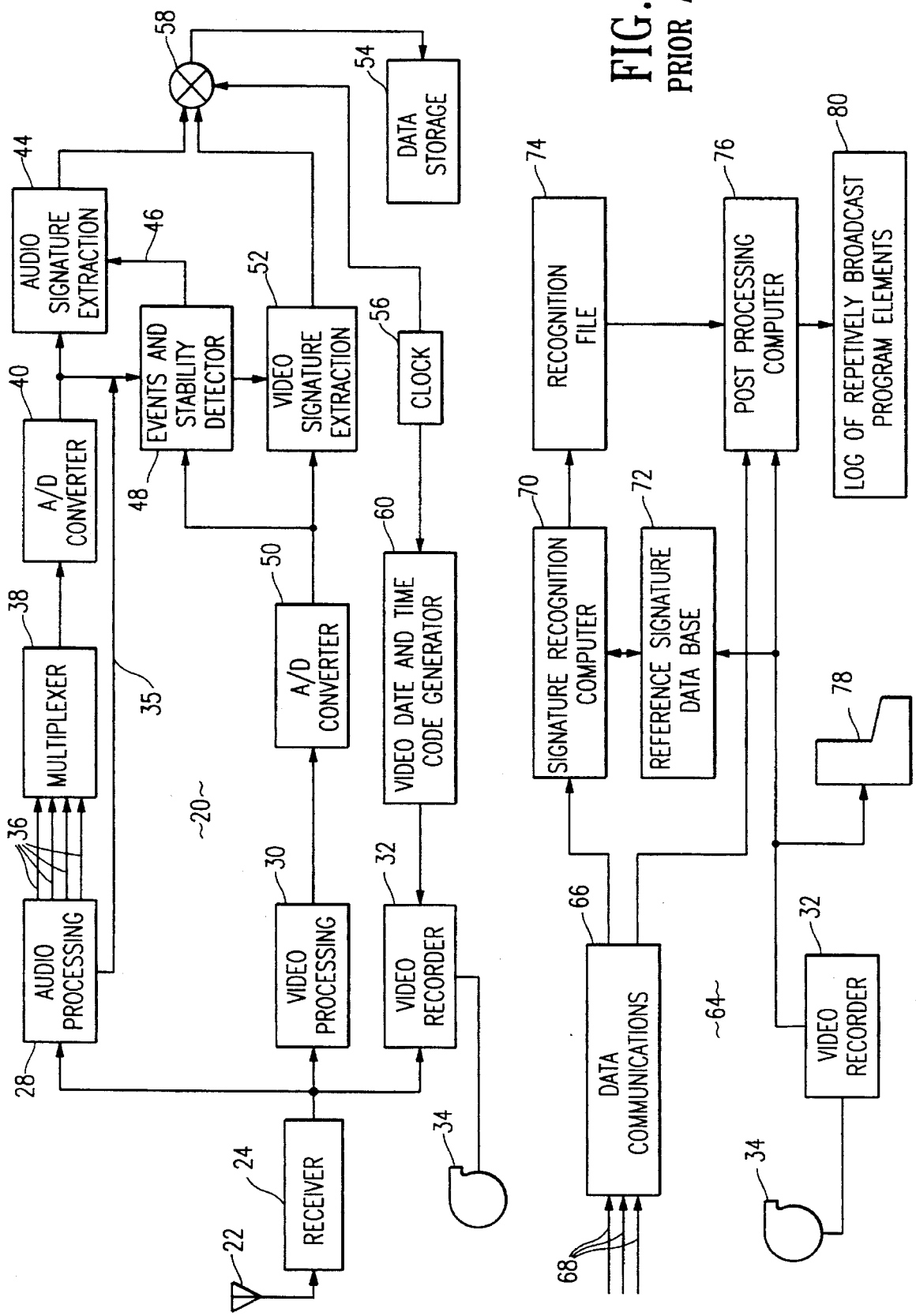
FIG. 1 shows a functional block diagram of a typical automated broadcast program monitoring and reporting system from the prior art.

FIG. 1 provides a block diagram of a typical unilateral broadcast program identification system from the prior art. The station monitoring unit 20 receives television broadcast signals from a receiving antenna 22. Antenna 22 could also represent a broadcast radio antenna. Signals from antenna 22 are applied to a receiver 24, which includes a tuner and amplifier (not shown). Receiver 24 is tuned to the monitored broadcast station and the desired program signal 26 is produced at the output of receiver 24. Program signal 26 is applied to the audio processing circuitry 28, to the video processing circuitry 30 and to a recorder 32, wherein program signal 26 is recorded on a storage medium 34.

Audio processing circuitry 28 includes an energy detector and a plurality of band pass filters (not shown) and provides a detected energy signal 35 and a plurality of audio signals 36 each representing the energy of signal 26 within a specified frequency band. Audio spectrum signals 36 are applied to the multiplexer 38, which connects each signal 26 in turn to the A/D converter 40, thereby producing the digitized multiplexed audio signals 42. Digitized audio signals 42 are applied to both an audio signature extraction circuit 44 and to an events detector 48. Events detector 48 produces an output signal 46 that enables audio signature extraction circuit 44 to extract an audio signature from digitized audio signals 32. Video processing circuitry 30 provides a signal representative of the video signal envelope to an A/D converter 50, which generates a digital representation of the video envelope. The digitized video envelope signal is applied to both a video signature extraction circuit 52 and events detector 48, which causes the signature of the digitized video signal to be extracted by video signature extraction circuitry 52 responsive to the detection of predetermined events that occur in the digitized video signal. The signatures from audio signature extraction circuit 44 and video signature extraction circuit 52 are stored in a data storage device 54 together with the corresponding extraction time and date. Extraction times are provided by a clock 56 that provides a digital representation of time to data storage device 54 by way of a combining circuit 58. Clock 56 also provides the digital representation of time to a video date-time code generator 60 that creates a digital representation of time for storage on medium 34 by recorder 32.

Station monitor unit 20 extracts and stores signatures and times of extraction thereof. At some convenient time (not in real-time), the stored signatures are applied to the signature and recognition post-processing unit 64, which compares the extracted signatures from the various station monitoring units 20 with a plurality of reference signatures taken from programs to identify particular corresponding broadcast programs. Several station monitoring units 20 may be interrogated at periodic intervals by the data communications circuit 66, which accepts the stored signatures from station monitoring units 20 by way of several communication lines 68.

The extracted signatures are compared by a signature recognition computer 70 to a library of reference signatures stored in a reference signature database memory 72. Signature recognition computer 70 collects and classifies signatures received from several station monitoring units 20 and also generates the reference signatures stored in reference database memory 72. Computer 70 compares the extracted signatures to the reference signatures from database memory 72 and classifies and stores them in a recognition file 74, which is coupled to a post-processing computer 76. Signature recognition computer 70 searches for instances of successive recognition of extracted signatures to identify a particular program. These successive recognized extracted signatures are provided to post-processing computer 76, which produces a file or log 80 containing records of the identified programs, commercial advertisements or other repetitively broadcast programs from each monitored broadcast station together with a starting time and the program duration. Post-processing computer 76 also provides extensive analytical services to logically check and flag incomplete or otherwise defective broadcast identifications and thereby enable user detection of false signal recognitions. Post-processing computer 76 also assigns a temporary code to identify each non-recognized or unmatched extracted signature to permit later manual review of the program recorded in medium 34 for manual identification. A data entry terminal 78 is provided for updating reference signature database 72.

The broadcast program identification system shown in FIG. 1 does not require real-time identification and processing because of the off-line use of signature data store 54. The system also relies on manual review of possible false detections and unmatched signatures, which is necessary because of the relatively low performance effectiveness of the automated elements.

The Invention

Figure 2:
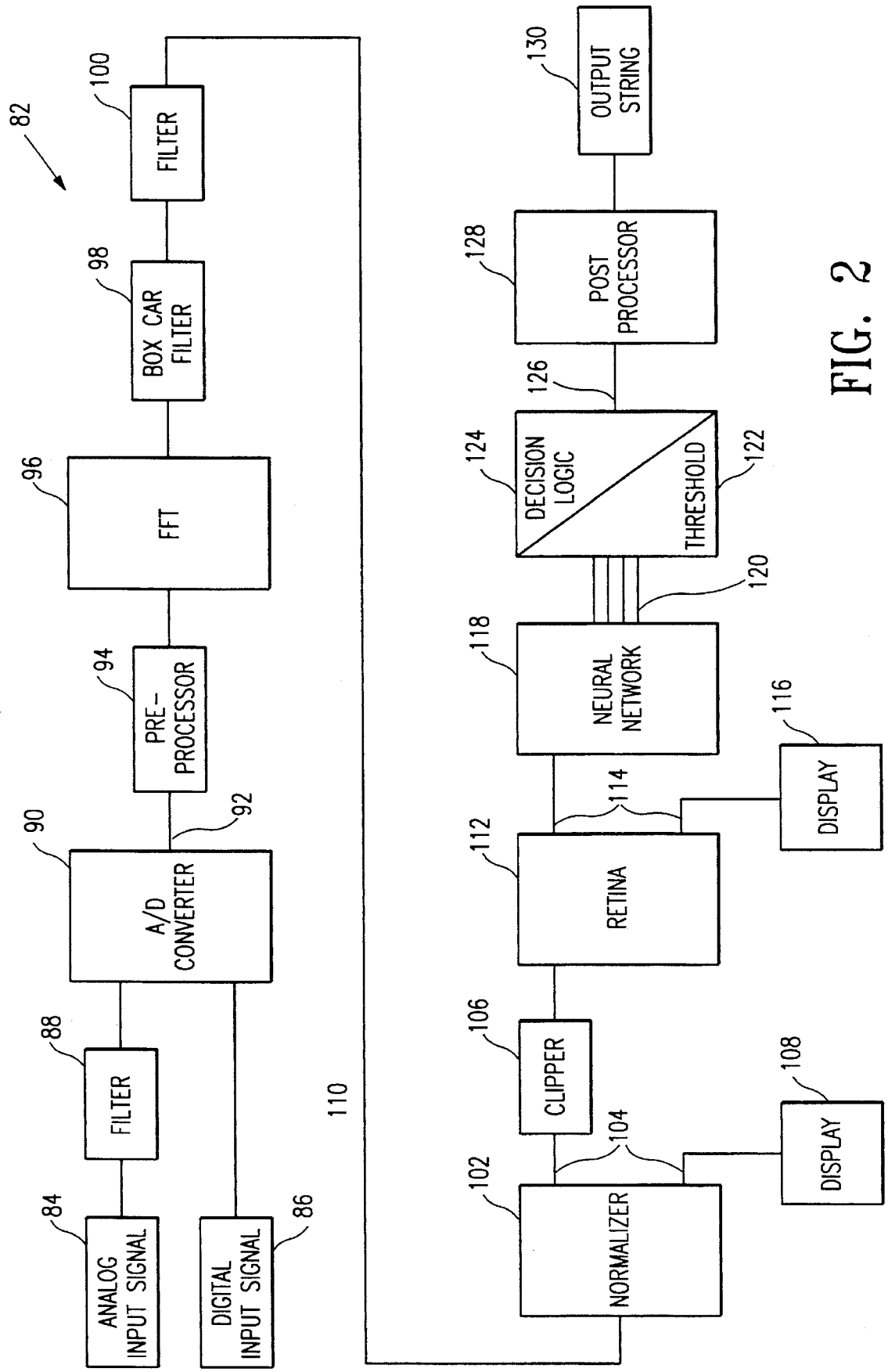
FIG. 2 shows a functional block diagram of the adaptive broadcast performance monitoring system of this invention.

FIG. 2 shows a functional block diagram of an illustrative embodiment of the adaptive broadcast program identification and reporting system 82 of our invention. System 82 accepts either analog or digital input signals representing audible performances of live and recorded musical works and the like. Analog input signal 84 may include real-time broadcasts of musical work performances in the AM/FM/SW frequency bands, for instance. A single broadcast frequency (e.g., FM 106.5 MHz or AM 600 kHz) constitutes a single channel of input signals for identification system 82. Digital input signals 86 may include musical work performances embodied as digital bus signals from radio stations, compact disk (CD) player outputs, multimedia system outputs, digital audio tape (DAT) recorder outputs, digital audio track signals from cinema media, cable system video/audio signals and other similar digital audio signals.

Analog input signal 84 is filtered through the anti-aliasing filter 88 and presented to the analog-to-digital (A/D) converter 90. Digital inputs 86 are connected directly to the digital side of A/D converter 90.

Anti-aliasing filter 88 is required for reasons well-known in the signal processing arts. Analog signal 84 must be filtered at a frequency below the Nyquist rate, which is defined as 0.50 times the sampling frequency. For example, the Nyquist frequency corresponding to a 6 kHz sampling frequency is 3 kHz and, to avoid the undesirable introduction of spectral "aliases" into the digital output from A/D converter 90, anti-aliasing filter 88 must restrict the analog passband to 2800 Hz or so.

A/D converter 90 provides a series of digital words (e.g., 16 bits) each representing the magnitude of analog input signal 84 at a sample time. Because signal 84 is sampled at, for instance, 6,000 Hz for an audible performance of a musical work, A/D converter must produce 6,000 digital sample signals per second, each of which includes 16 bits.

These digital sample signals are produced by A/D converter 90 on signal bus 92 and are processed through a pre-processor 94. Signals 92 are first "windowed" in pre-processor 94 to shape the spectral envelope by removing undesired sidelobes. After windowing, the digital sample signals are overlapped and averaged to ensure relatively smooth variation over time. This smoothing procedure is also accomplished in pre-processor 94. Both windowing and smoothing procedures are well-known in the signal processing arts.

The digitized, windowed and smoothed sample signals are next presented to a standard Fast-Fourier-Transform (FFT) circuit 96. FFT circuit 96 creates a series of complex digital signals each representing the spectral power existent within one frequency bin of the smoothed, windowed digital sample signal time series in a manner well-known in the art. For audible performances of musical works, the output of FFT circuit 96 is primarily of interest over a 3 kHz frequency region.

The complex digital spectral signals from FFT circuit 96 are first presented to a Boxcar filter 98, which initializes the subsequent portions of the digital system by creating a time delay. The output value during such time delay is the average of the first 40 data samples at system startup before processing begins. After processing begins, Boxcar filter 98 is replaced with an exponential smoothing filter 100 to smooth the digital FFT signals into the normalizer 102.

Normalizer 102 accepts the digital FFT power signals from exponential smoothing filter 100 and processes them to remove steady-state frequency components. Normalizer 102 accomplishes this by first creating a new digital signal representing the logarithm (base 2) of the initial FFT spectral power signal for each frequency bin in operating frequency range of interest. Normalizer 102 then creates a signal for each frequency bin representing the ratio of the latest FFT spectral power level for the bin divided by the exponentially smoothed or average spectral power level for the bin. Thus, the digital spectral signals 104 produced by normalizer 102 represent the original FFT spectra normalized to their moving averages, which is a known useful method for removing steady-state elements from a signal.

This operation of normalizer 102 emphasizes the transient elements of the spectral signature of the audible musical work performance, which is an important element of the method of our invention. This element arises from our unexpectedly advantageous discovery that the transient spectral elements of musical work performances can be organized to form a signature that is generally recognizable throughout the entire performance of the musical work. This is not generally true for the transient temporal elements generally exploited by prior art systems such as that discussed above in connection with FIG. 1.

Normalized FFT spectra 104 created by normalizer 102 are divided into two chains. One such chain is sent to a clipper 106 for further processing, including summation over time and frequency bins. The second such chain is sent to a display 108 for producing a pixel array wherein pixel brightness is proportional to the magnitudes of normalized FFT spectra 104.

Clipper 106 includes a filter that clips and scales each of the normalized FFT spectra 104 to eliminate anomalous values outside of a range of interest. Signal amplitudes are limited by clipping to a maximum value of $$\frac{\log_2 P}{\log_2 \hat{P}} < 10.$$

The clipped normalized FFT spectra 110 from clipper 106 are next organized over frequency and time bins to create an array of R elements herein denominated "retinal" signals $[S_r]$ making up a retina 112.

The operation of retina 112 is yet another important element of the method of our invention, which arises from our unexpectedly advantageous discovery that the spectral signature of audible musical work performances can be organized in a two-dimensional array representing predetermined combinations of frequency bins and time bins to create a recognizable pattern useful as a "signature" for identifying the musical work. Our retina concept can be best understood by considering each set of "retinal signals" or each "retina" as a two-dimensional pattern of pixels that is visually recognizable by a human operator as having distinctive patterns and features representing a particular musical work performance. Of course, a human operator can readily recognize the audible performance itself because of the normal human aural pattern-recognition capabilities for music and sound. The purpose of our retina 112 is to organize the transient elements of the spectral signature of a musical work performance into a matrix array suitable for automated recognition by a "trained" neural network. This process is discussed in more detail below in connection with FIGS. 3–6.

Retina 112 organizes the clipped normalized FFT spectra signals 110 by averaging each over a selectable number of frequency bins and a selectable number of time sample bins to create a two-dimensional array of R retinal signals ($S_r$), where $1 \leq r \leq R$. In the exemplary embodiment discussed below, the retinal size is limited to R=2000 because of hardware storage limitations. We found that R=1920<2000 is sufficient for excellent identification performance. The R=1920 retinal signals can be, for instance, distributed over 64 columns in frequency and 30 rows in time, where each retinal signal $S_r$ represents an average over five adjacent frequency bins (columns) and two successive overlapped time samples (rows). Such an exemplary distribution represents approximately 5.12 seconds in total analog input signal time for a single retina. After an update interval $t_U$=0.17 seconds, the retina content changes by losing the one oldest row and gaining one new row. Thus, as used herein, a retina represents a two-dimensional embodiment of a musical work performance signature, spanning a retinal time interval $t_R$ (5.12 seconds, for example) of the performance, that is updated regularly (e.g., every $t_U$=0.17 seconds) as the performance continues.

The retinal signals 114 created by retina 112 are sent to two destinations. Retinal signals 114 are provided to a display 116 for visual inspection by a human operator. Retinal signals 114 are also presented to the neural network 118.

Neural network 118 is preferably a standard, fully connected, feed-forward multilayer perceptron consisting of an input layer, two hidden layers and an output layer, the operation of which can be better understood with reference to the discussion below in connection with FIG. 5. For example, neural network 118 would include 1920 inputs for an exemplary 64×30 retina. The first hidden layer may include twenty neurons, the second hidden layer may include fifteen neurons and the output layer may include twelve neurons. With this example, neural network 118 provides twelve neural output signals 120, one from each of the twelve output layer neurons. Thus, as practitioners in the neural network arts readily appreciate, this exemplary embodiment of neural network 118 provides one set of values for S=12 neural output signals 120 responsive to each set of R=1920 retinal signals 114. When the R retinal signals 114 are updated in response to passage of an update time interval $t_U$, each of the S neural output signals 120 is similarly updated. The operation of neural network 118 is governed by the values of S sets of N weights $\{(w_n)_s\}$, where $1 \leq n \leq N$ and $1 \leq s \leq S$. The number of weights is N*S and is a function of the number of linkages between neurons. N*S=38,880 in the above exemplary embodiment of neural network 118 having 47 neurons in three layers with R=1920 inputs and S=12 outputs. An additional 47 neuron bias thresholds ($\theta_s$) also affect the operation of neural network 118.

Neural output signals ($N_s$) 120 are each normalized to a predetermined threshold $T_s$ in the thresholding circuit 122. The ratio of each neural output signal 120 to the corresponding predetermined threshold ($N_s/T_s$) is presented to a decision logic 124, which selects either none or only one of the S=12 neural output signals ($N_s$) 120 as a decision output signal $N_I/T_I$, shown as decision signal 126 in FIG. 2, where I is the selected index so that $1 \leq I \leq S$.

The predetermined threshold signals ($T_s$) used by thresholding circuit 122 are manually defined during the training of neural network 118. We select these threshold signals to optimize the error rates associated with "false identification" and "missed detection" as discussed in detail below in connection with FIGS. 11A–11D. The events surrounding the selection of decision signal 126 are captured and recorded in a data file for analysis and reporting purposes and decision signal 126 is presented to the post-processor 128.

Post-processor 128 examines the file of events surrounding the presentation of decision signal 126 to identify the precise date-time tag and musical work performance identification index I. These data are assembled to form a single output record and are presented as output string 130 for report logging and display. All raw data surrounding the presentation of decision signal 126 can be recorded and stored for archiving purposes.

Output string 130 is a listing of the identification of the event, identification of the source of the original audible signal, a date-time corresponding to the time of signal reception from the source and all related catalog information available in the identification library (not shown).

Figure 3:
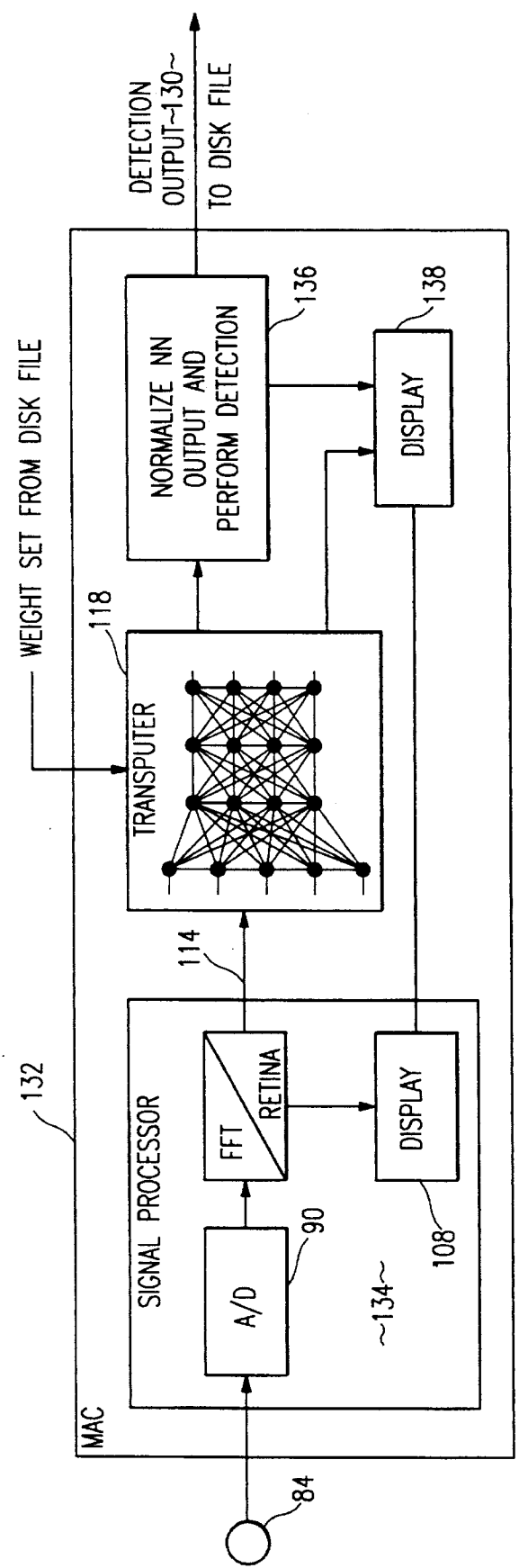
FIG. 3 shows a functional block diagram of the signal processing portion of the system from FIG. 2.
Figure 4D:
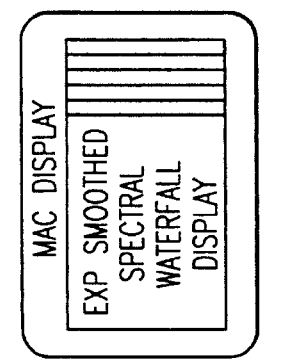
FIGS. 4A, 4B, 4C and 4D show several illustrative signals at various stages during the processing of the subsystem from FIG. 3.
Figure 4C:
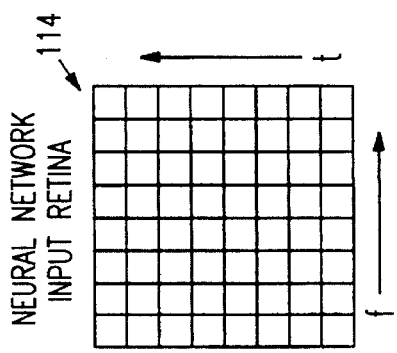

FIG. 3 shows an exemplary embodiment of the system of this invention implemented within a Macintosh computer 132. FIG. 4A shows a waveform representing an exemplary embodiment of analog input signal 84. Within computer 132, a signal processor 134, embodied as two Spectral Innovation circuit boards (see FIG. 7), provides the analog-to-digital converter 90, and subsequent FFT, smoothing and retina functions discussed above as well as the display 108 function.

Figure 4B:
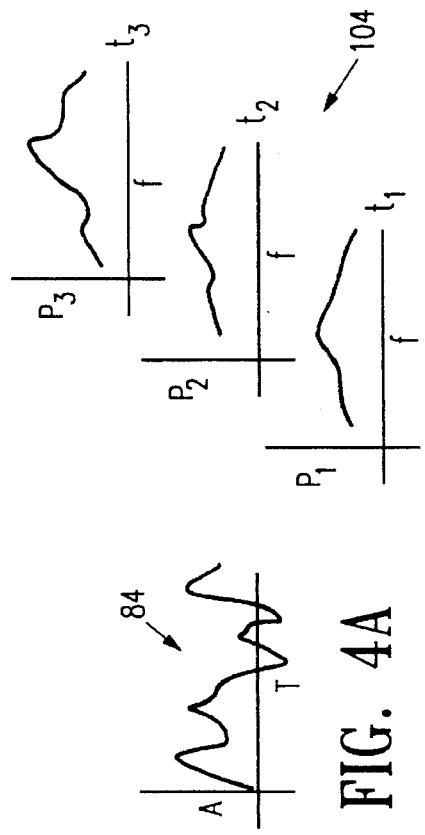
Figure 4A:
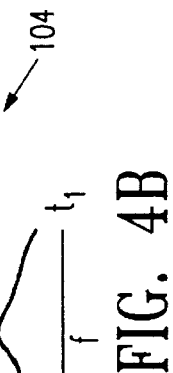

FIG. 4B illustrates the time-varying values of several exemplary normalized FFT spectra 104 (FIG. 2). FIG. 4C illustrates the two-dimensional organization of retinal signals ($S_r$) 114 (FIG. 1) that are presented to neural network 118. In FIG. 3, neural network 118 is embodied as a Quad-Transputor Board, which receives the plurality N*S+S of weight and bias signals from a separate disk file (not shown). Finally, the thresholding, decision logic and post-processing functions are embodied in software 136, which creates output string 130 for external storage in a disk file (not shown). FIG. 3 also shows a display handler 138 for creating displays of intermediate and final output signals from Quad-Transputor Board 118 and software module 136. FIG. 4D illustrates one such display, showing a spectral waterfall display of neural output signals ($N_s$) 120 each normalized to a corresponding predetermined threshold signal $T_s$.

Figure 7:
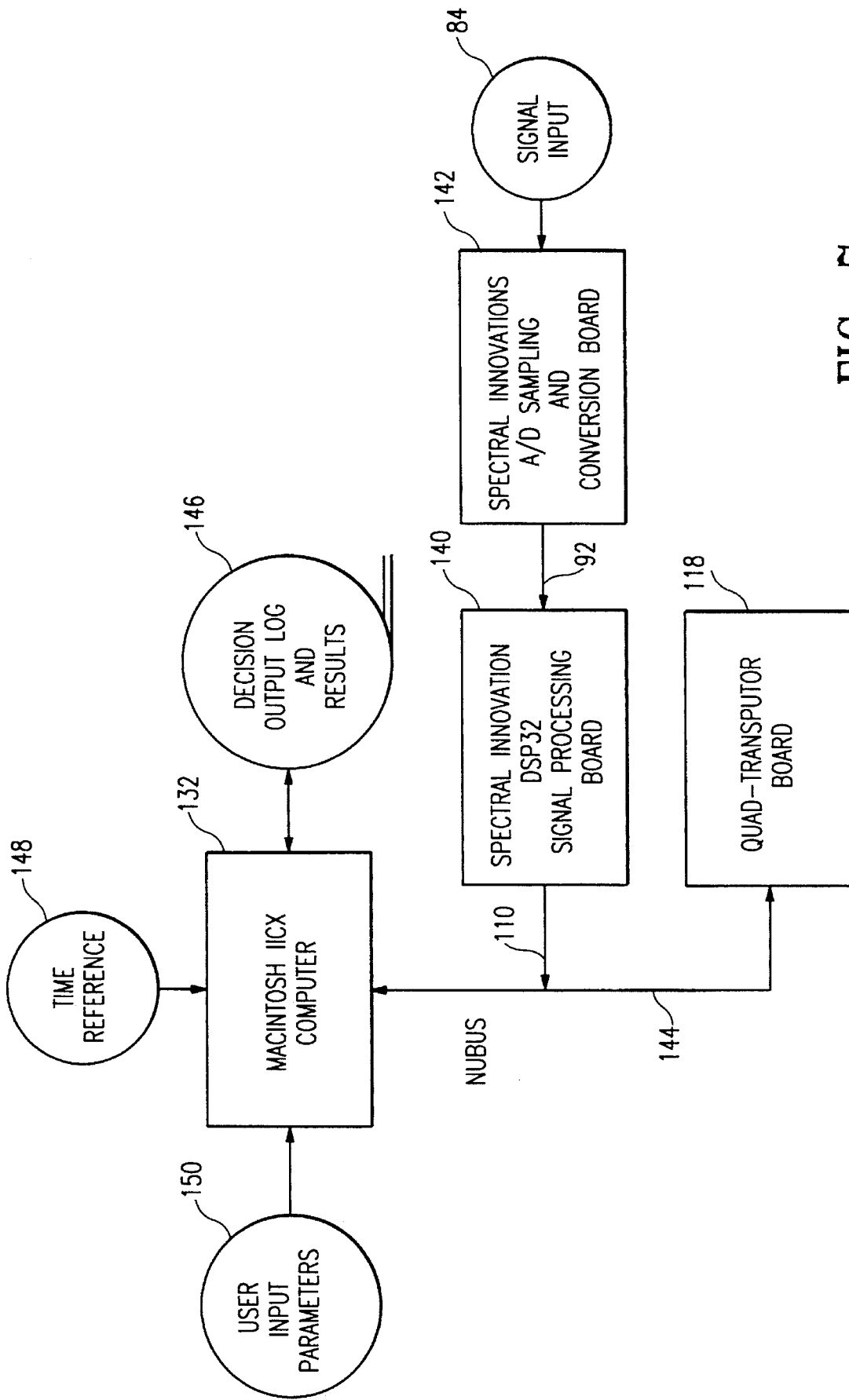
FIG. 7 shows a functional block diagram of a preferred embodiment of the system from FIG. 2.

FIG. 7 provides another functional block diagram showing our system as it can be embodied on Macintosh IIcx personal computer 132. The digital signal processing functions 134 (FIG. 3) include a Spectral Innovations DSP 32 Signal Processing Board 140 and a Spectral Innovations A/D Sampling and Conversion Board 142. Analog input signal 84 is presented to SI Board 142, which creates digital sample signals 92. Signals 92 are presented to SI DSP 32 Board 140, which creates clipped normalized FFT spectra 110. Spectra 110 are forwarded to a NuBus 144, which operates at the high speed required (10 MB/sec) to handle the volume of digital data presented by Board 140. Neural network 118 is embodied as a Quad-Transputor Board, which accepts retinal signals from bus 144 and creates neural output signals 120, forwarding them to computer 132 on bus 144.

The hardware configuration for neural network 118 and related elements may be implemented with any useful product available commercially, such as SI DSP 32 Board 140 in conjunction with the Transputor chips on a Levco circuit board 118, or an i860 array processor chip set running in a VME-based system configured as a massively parallel processor.

In FIG. 7, the input to neural network 118 is a series of retinas expressed as time slices of data separated by an update time interval $t_U$. Each transputor or i860 contains four parallel processors (not shown). The first of these processors operates as the manager and allocates data to the remaining three "slave" processors as well as carrying its share of the retina processing load. Four retina time slices are presented to the Quad-Transputor Board simultaneously. Each of the four transputors is responsible for processing each layer moved in time by one update time increment $t_U$. Thus, each of the four processors provides a parallel output through the decision selection logic 124.

A disk file 146 suitable for mass data storage is coupled to computer 132, providing for the storage of the decision output log and identification results. A time reference 148 is coupled to computer 132, providing the date and time information necessary for useful identification log entries. Time reference 148 may be either internal to computer 132 or external. A keyboard 150, or other useful means for the input of user-selected parameters, is coupled to computer 132 to provide user control of the automated processes of our invention.

The prototype system illustrated in FIG. 7 is trained using a single five-second sample from each prerecorded musical work spanning a performance time of four to eight minutes and still manages to correctly identify the musical work in real-time with over 90% reliability, as discussed in detail below in connection with FIGS. 11A–11D. Thus, our invention also rests on the unexpectedly advantageous discovery that a single retinal sample of a musical work contains sufficient information to allow automated recognition of other performances of that same musical work, provided that the sample is organized in accordance with the retinal architecture of our invention. This advantageous discovery is exceptionally useful because it avoids the requirement for training our system over the entire musical work, such as is implied by the prior art systems exemplified by the system described above in connection with FIG. 1. Moreover, repeated detections can be obtained throughout the musical work by a neural network trained on the retinal pattern extracted from the single five second sample.

We tested the system illustrated in FIG. 7 on a sample of 10 musical works, training the neural network with a single retina extracted from each of the 10 works. Although the neural network was trained with imposed noise to enlarge the apparent dimension and thus fuzzify the resulting pattern recognition model of the training samples into 38,927 adapted weights and bias offsets using a back propagation technique described in more detail below in connection with FIGS. 5 and 6. This training permits real-time unattended detection and logging of musical work performances and requires substantially less processing power than any scheme known in the art that requires the reduction of an entire work into a "signature".

The neural network recognition of "retinas" is an important element of our invention and is now described in detail in connection with FIG. 5. Our retina concept arose from several unexpectedly advantageous observations and discoveries regarding musical work performances. The human voice contains low fundamentals in the 120 Hz frequency region and overtones (for female voices) up to 2000 Hz. Many musical instruments provide significant acoustical power over the entire frequency range between 50 Hz and 3000 Hz. Some instruments produce even higher frequency overtones.

We first limited the Fast-Fourier-Transformer (FFT) size to integral powers of two, thereby restricting the horizontal retinal dimension to powers of two (2, 4, 8, 16, etc.). We did not restrict the number of time samples and thus our vertical retina dimension is limited only to some integer number. The total size R of the input retina is limited to R=2000 elements in our exemplary embodiment by the on-board storage capacity of SI DSP board 140 (FIG. 7). The closest reasonable number of distinct frequency bins required to cover the frequency region between 100 Hz and 2000 Hz is first assumed to be between 16 and 128 because these upper and lower limitations, applied to the S=2000 limitation, provides vertical row limits of 125 and 15.62, respectively. Because the number of retinal rows is limited to an integer, selection of the lower limit forces rounding down the row value to 15.

Having selected an operating frequency range of about 2000 Hz for monitoring all types of musical work performances, our exemplary hardware requirements impose a minimum sampling frequency of about 6000 Hz to provide the Nyquist frequency of about 3000 Hz imposed by the 2000 Hz operating frequency range. Thus, having established the sampling rate at 6000 Hz, our system time resolution is then determined by our choice of FFT length and "blocking" factor, which represents the number of FFT samples that are accumulated to form a single retina row. The resulting frequency bin width is also established by our choice of FFT length together with an arbitrary choice of an integral number of adjacent frequency bins to form a column element within each blocked row.

We investigated using FFT sizes of 512, 1024 and 2048 bins, using a 50% overlap. The resulting time resolutions are 0.085 seconds, 0.17 second and 0.34 seconds, respectively, and the 50% overlap windowing halves these resolutions. For example, if we use a 1024 point FFT with a 50% overlap, then two adjacent time samples are summed to maintain the requisite 0.17 second temporal resolution. In the above example, the frequency resolutions are 11.7 Hz/bin, 5.85 Hz/bin and 2.92 Hz/bin, respectively. With the 1024 point FFT and our 6000 Hz sampling rate, we then average the power spectral values over five adjacent frequency bins to provide a 29.25 Hz frequency resolution in retina 112. We discovered that this approximately 30 Hz frequency resolution is sufficient for adequately discriminating most human voice and musical instrument sound patterns within the constraints imposed by our prototype system shown in FIG. 7.

Because the total retina is limited to 2000 elements, a 1024 point FFT with 50% overlap and a 6000 Hz sampling frequency provides a R=1920 bin retina of 30 rows in time and 64 columns in frequency, assuming that two successive overlapped time samples are averaged to form each row and five adjacent frequency bins are averaged to form each column. This 30×64 retina topography (FIG. 5) represents a 5.12 second segment of analog input signal 84. Retina 112 is then updated in a First-In-First-Out (FIFO) manner by dropping the oldest row and adding the newest row responsive to an elapse of $t_U$=0.17 seconds.

We also advantageously discovered that retina 112 need not include columns representing the lowest audio frequencies because the human voice and most musical instruments do not provide significant spectral energy in frequencies below about 120 Hz. Thus, we incorporated an offset in retina 112 so that the first 20 bins (from 0 Hz through about 117 Hz) of the 1024 point FFT are abandoned. With this 20 bin (117 Hz) offset, the 30 rows in retina 112 each span 64 columns of 29.25 Hz each (5×5.85 Hz/bin) for a total retina bandwidth of 1872 Hz over an operating frequency range of 117 Hz to 1989 Hz, roughly approximating 120 Hz through 2000 Hz. We found that this operating frequency region is sufficient for highly efficient musical work identification and discrimination, given the other important features of our invention.

Figure 5:
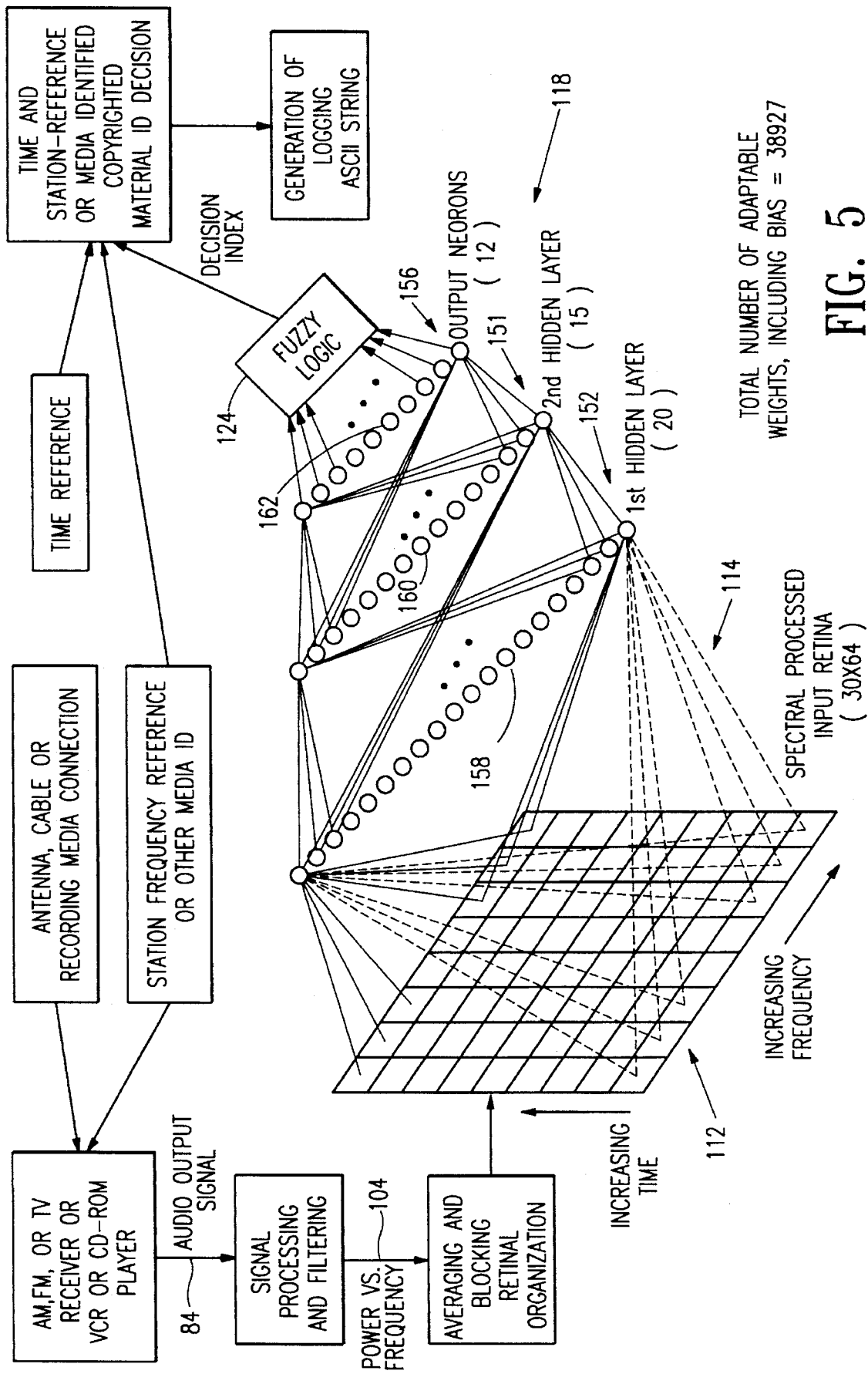
FIG. 5 shows a functional block diagram of the neural network element of this invention.
Figure 6:
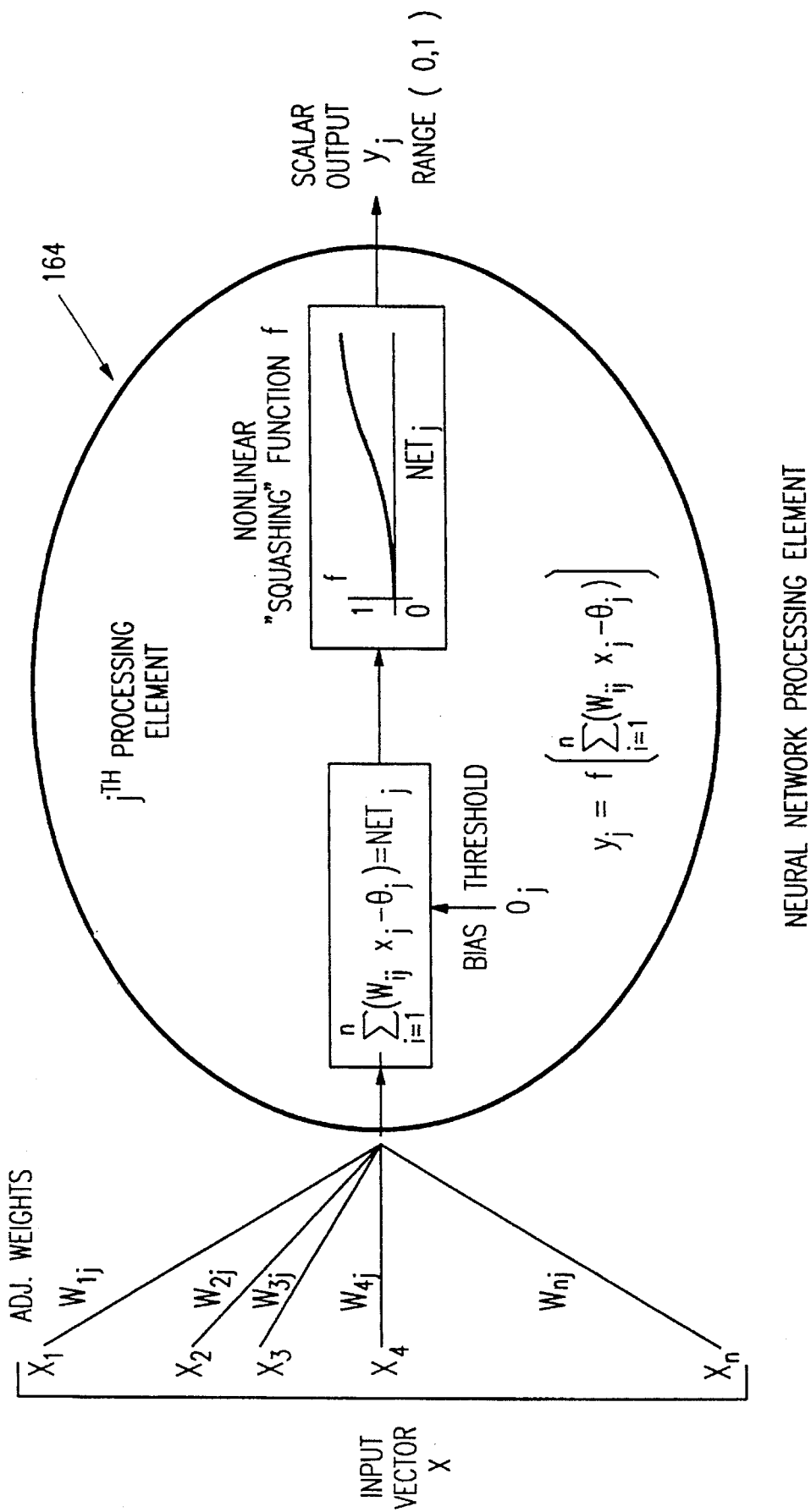
FIG. 6 illustrates a single neural network processing element used in the subsystem from FIG. 5.

Referring to FIG. 5, neural network 118 is shown having a first hidden neuron layer 152 coupled to a second hidden neuron layer 154 that in turn is coupled to an output neuron layer 156. First hidden layer 152 includes twenty neurons exemplified by the neuron 158. Similarly, second hidden layer 154 contains fifteen neurons exemplified by the neuron 160 and output neuron layer 156 includes twelve neurons exemplified by neuron 162. FIG. 6 illustrates the operation of each of the 47 neurons shown in the three layers 152–156 in FIG. 5. FIG. 6 shows the $j^{th}$ neuron 164, which accepts weighted inputs from every neuron of the preceding layer of neural network 118. That is, $j^{th}$ neuron 164 is associated with a weight vector $(w_i)_j$ and a bias threshold $\theta_j$. The number of weights in weight vector $(w_i)_j$ depends on the number of elements in the preceding layer of neural network 118. For instance, in FIG. 5, neuron 158 is associated with a weight vector having 30×64=1920 elements, each being one of the 1920 signals in retina 112. Because each neuron in first hidden layer 152 is associated with a different weight vector $(w_i)_j$ and bias threshold $\theta_j$, neural network 118 maintains a total of 38,420 independent adaptive factors for the twenty neurons in first hidden layer 152.

Similarly, neuron 160 in second hidden layer 154 is associated with a weight vector $[w_i]_j$ having twenty elements, one each for the twenty neurons in the preceding first hidden layer 152. Thus, neural network 118 maintains 315 independent adaptive factors (including bias thresholds) for the fifteen neurons in second hidden layer 154. Finally, with similar reasoning, 192 independent adaptive factors are associated with the twelve neurons in output neuron layer 156. The total number of adaptable factors included in neural network 118 of FIG. 5 is 38,927.

FIG. 6 shows that the actual operation of $j^{th}$ neuron 164 proceeds according to the well-known neuron logic principles known in the art. That is, a biased weighted sum of an input vector is nonlinearly normalized to a range (0,1) and provided as the single output $y_j$. The usefulness of neural network 118 is found in our training procedure for establishing the values of the 38,927 adaptable weights and biases. The training procedure for neuron 164 (FIG. 6) is summarized in formal notation in Table 1 below.

TABLE 1

| NEURON TRAINING PROCEDURE | |
|---|---|
| For Output Neurons: | For Hidden Layer Neurons: |
| $w_{ij}(t+1) = w_{ij}(t) + \eta \delta_j x_j$ | $w_{ij}(t+1) = w_{ij}(t) + \eta \delta_j x_j$ |

TABLE 1-continued

NEURON TRAINING PROCEDURE where $\delta_j = y_j(1 - y_j)$
$(d_j - y_j)$ where $\delta_j = y_j(1 - y_j)\left(\sum_{i=1}^{m} \delta_i w_{ij}\right)$ and $d_j$ = the desired output and $\delta_i$ = previous errors Table 1 represents standard neural network training procedures known in the art. We select a single retinal sample of a musical work performance for training neural network 118. This selected retinal sample is provided to neural network 118 as input vector X in FIG. 6 and the 38,927 weights and biases are adjusted iteratively to reduce the error $\delta_j$ in the desired output $d_j$ to an acceptable level.

Figure 8:
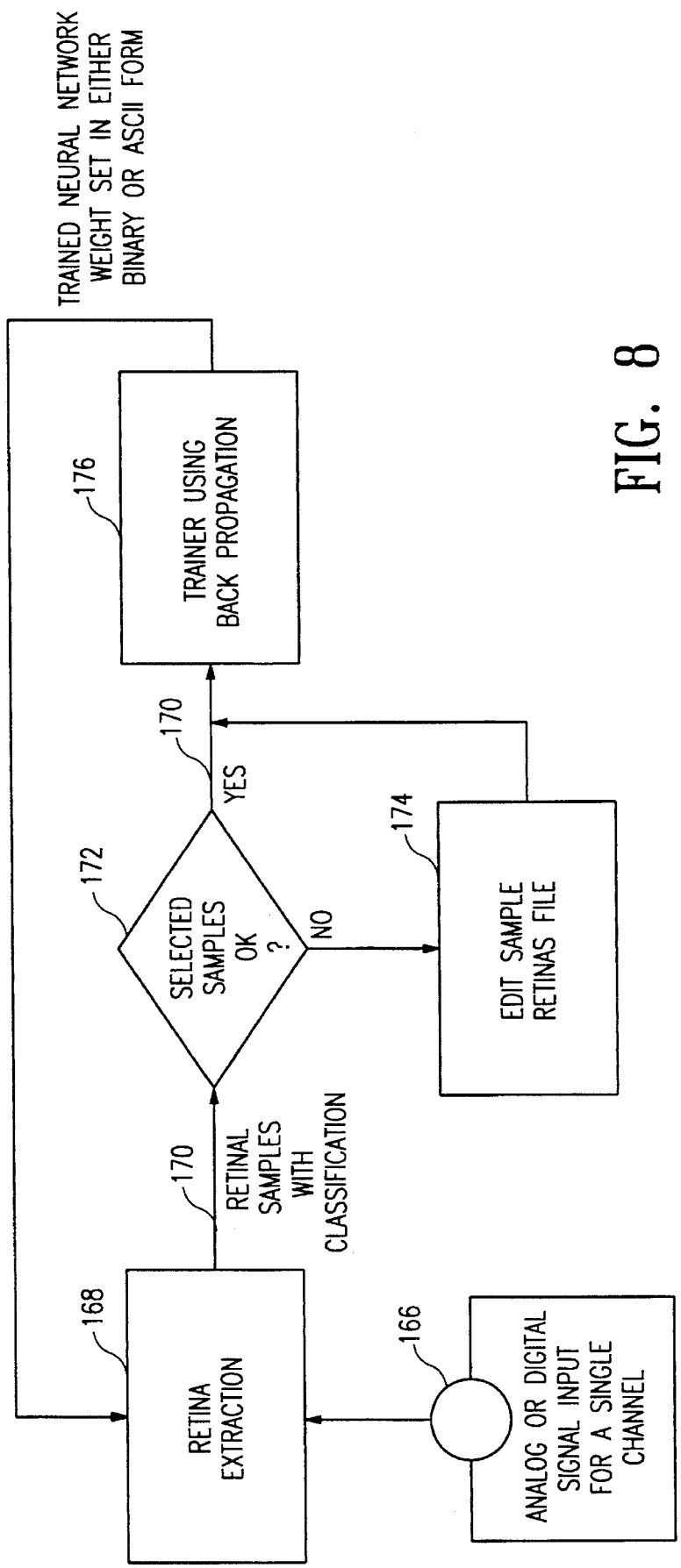
FIG. 8 is a block diagram illustrating the neural network training method used with the system of this invention.

FIG. 8 shows a procedural block diagram illustrating the neural network training technique used in our invention. The selected sample 166 is presented to the signal processing portion 168 for extraction of a selected training retina 170. Training retina 170 is examined at step 172 and edited in step 174 by the user as desired. Selected training retina 170 is then presented to the training routine 176, which implements the procedures summarized above in Table 1 and produces a 39,880 weight set $\{(w_{ij})\}$ and the 47 neuron bias thresholds ($\theta_j$) making up the 38,927 adjustable factors. These new factors are fed back to the retina extraction procedure 168 and selected training retina 170 is refreshed responsive to the new factors. The process is repeated iteratively until neural network 118 is "trained" to recognize selected training sample 166 with a predetermined level of confidence.

An important element of the system of our invention is the addition of random noise to selected training sample 166 before using it in training neural network 118. A uniform noise factor is applied to each training retina processed during training. This addition of noise to selected training sample 166 is a technique that arose from the unexpectedly advantageous discovery that the "fuzzifying" of the resulting pattern recognition model enlarges the apparent dimension of sample 166 and contributes to neural network 118 recognition of a musical work performance throughout a second performance when trained with a single "five-second" sample extracted from a first performance.

In FIG. 8, after initial training of a weight set over the selected sample retina 166, the identification and logging system is tested using the entire musical work performance and the results file is saved for later analysis. Using STATVIEW or a similarly useful statistical analysis tool, the neural output signals ($N_s$) are examined over the course of the musical work performance and can be plotted in the manner illustrated in FIGS. 11A–11D. In these plots, peak neural output signal activity can be observed for each musical work performance and for all other musical work performance in any particular sample.

The operation of thresholding circuit 122 and decision logic 124 (FIGS. 2–3) are now described. Before thresholding and decision-making, neural output signals 120 are each first smoothed to reduce "false alarm" probability. We prefer the exponential smoothing technique exhibited in the procedural block diagram of FIG. 10.

Figure 10:
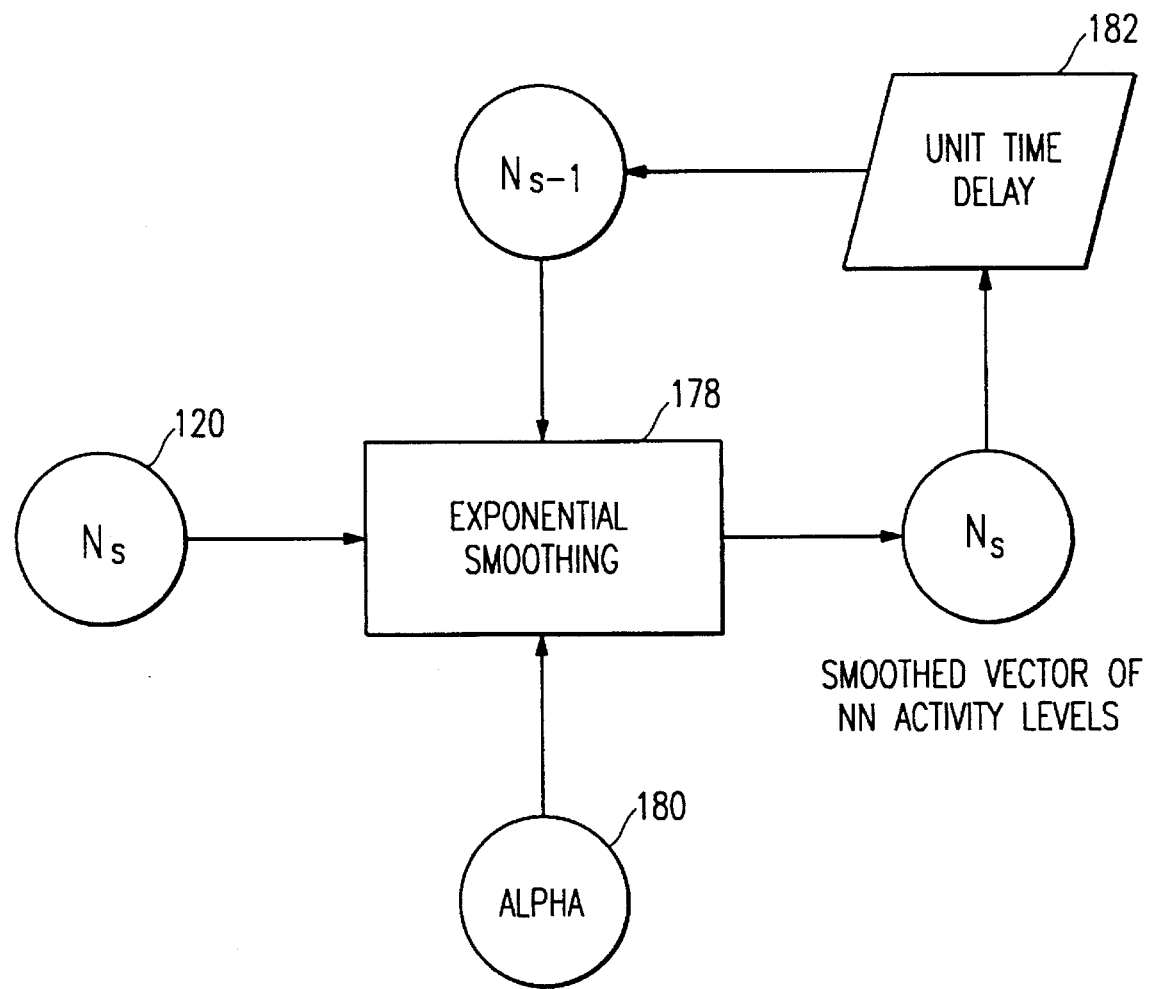
FIG. 10 illustrates the exponential smoothing procedure used to smooth the neural network output signals presented to the fuzzy decision logic from FIG. 9.

In FIG. 10, each of the neural output signals 120 are exponentially smoothed in the step 178 according to the following formula.

$$\hat{N}_s = \alpha N_s + (1-\alpha)N_{s-1}$$

The smoothing constant 180 is denominated $\alpha$ and is perhaps 0.75 in value. The output $N_s$ from exponential smoothing step 178 is delayed by update time interval $t_U$ to form $N_{s-1}$ in a step 182. $N_{s-1}$ is fed back into step 178 to contribute to generation of the subsequent smoothed neural output signal value $N_s$.

Figure 9:
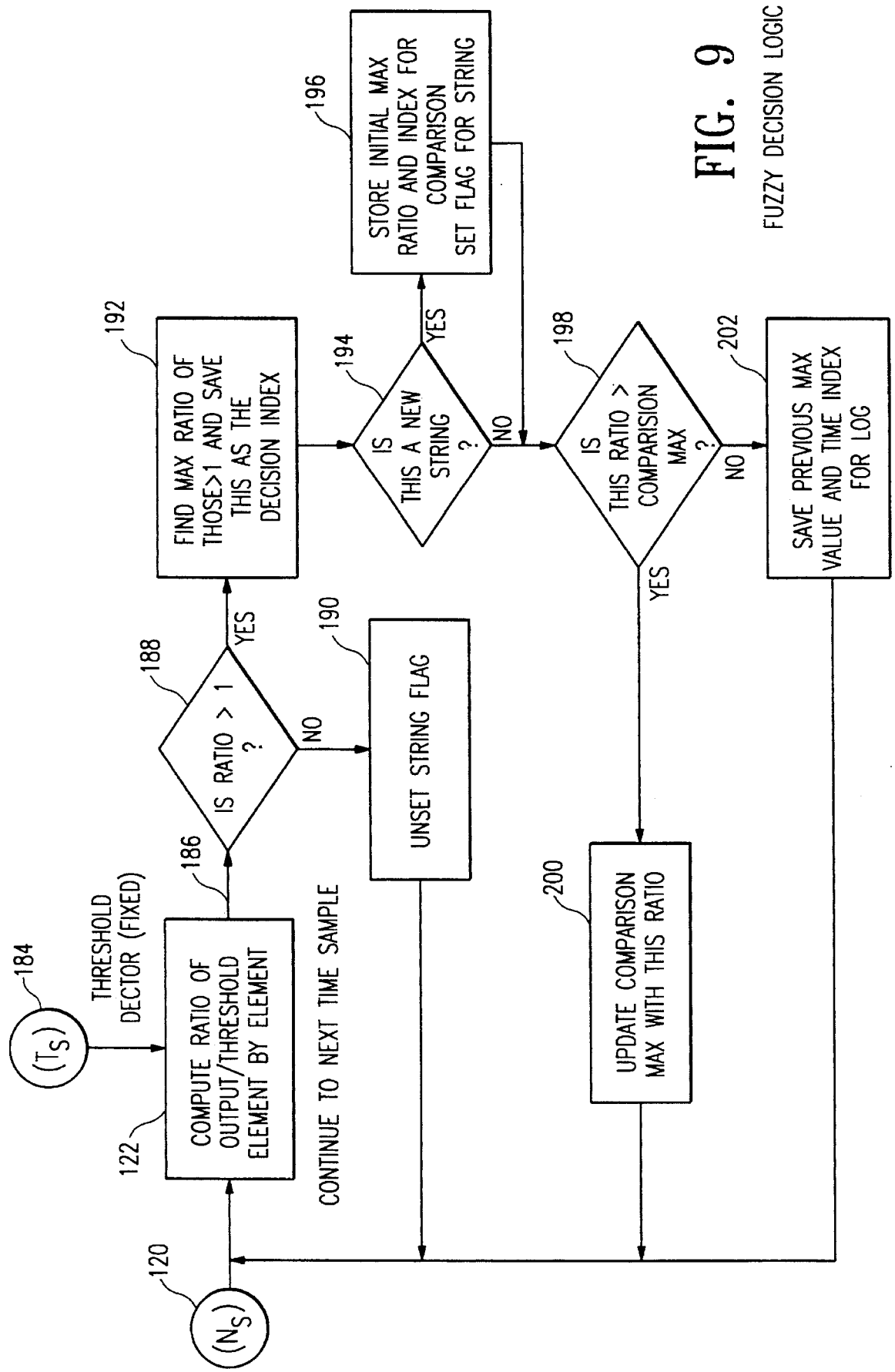
FIG. 9 is a functional block diagram of an illustrative embodiment of the fuzzy decision logic of this invention.

FIG. 9 shows a functional block diagram illustrating the fuzzy decision logic procedure incorporated in decision logic 124 (FIGS. 2–3). Neural output signal vector ($N_s$) 120 is combined with a threshold vector [$T_s$] 184 in thresholding circuit 122 to create a plurality S of ratio signals 186 representing the ratios ($N_s/T_s$). Each ratio signal $N_s/T_s$ 186 is then tested in step 188 to determine if it exceeds unity. If no ratio signal 186 exceeds unity, control is returned in flag step 190 and no decision is made. The process is then repeated for the next neural output signal set responsive to the passage of update time interval $t_U$.

If step 188 finds that one or more of ratio signals 186 exceed unity in value, then the vector ($N_s/T_s$) of ratio signals 186 is tested in step 192 to find the maximum ratio signal value, $N_I/T_I$. The index I of this maximum ratio signal is tested in step 194 and stored as an "Initial Maximum Ratio" 196 if it is found to be a new string. If not, ratio $N_I/T_I$ is tested again in step 198 to see if it exceeds the previously stored maximum value for index I. If step 198 finds that the new value exceeds the previously stored maximum, then the stored maximum is updated in step 200 and the procedure awaits the next iteration. If step 198 finds that the new value for the $I^{th}$ ratio has fallen below the previously stored maximum, then that previous maximum stored value is stored as an identification alarm in step 202 together with time and date information and the process stops to await the next iteration. Note that this procedure ensures that the actual alarm threshold detection step 202 is not executed until at least one neural output signal $N_I$ rises above a corresponding predetermined threshold $T_I$ to a maximum and thereafter begins to decline. This refinement is an important element of the method of our invention that we have found reduces "false alarm" detection rates to very low levels.

In FIG. 9, steps 188 and 192 can be refined to incorporate our alternate concept of delaying the decision until the "specificity" rises above some predetermined threshold value. That is, step 192 can be further conditioned on finding that the peak ratio $N_I/T_I$ differs from the next largest ratio value by a "sufficiently large" difference to permit an "unambiguous" decision.

The procedure discussed above in connection with FIG. 9 is equivalent to detecting a peak in the output of a fuzzy-OR combination of the ratio signals 186 when viewed as unnormalized fuzzy ratio signal values. For this reason, we refer to this process as as fuzzy decision logic.

We consider the neural output signals [$N_s$] 120 as a set of fuzzy numbers viewed over some time window. These neural output signals represent the fuzzy probability that the hypothesis recognized by the $s^{th}$ neuron is true. It is this unexpectedly advantageous observation that led us to incorporate fuzzy decision methods in refining the selection of decision signal $N_I/T_I$ 126 in FIG. 2.

Figure 11A:
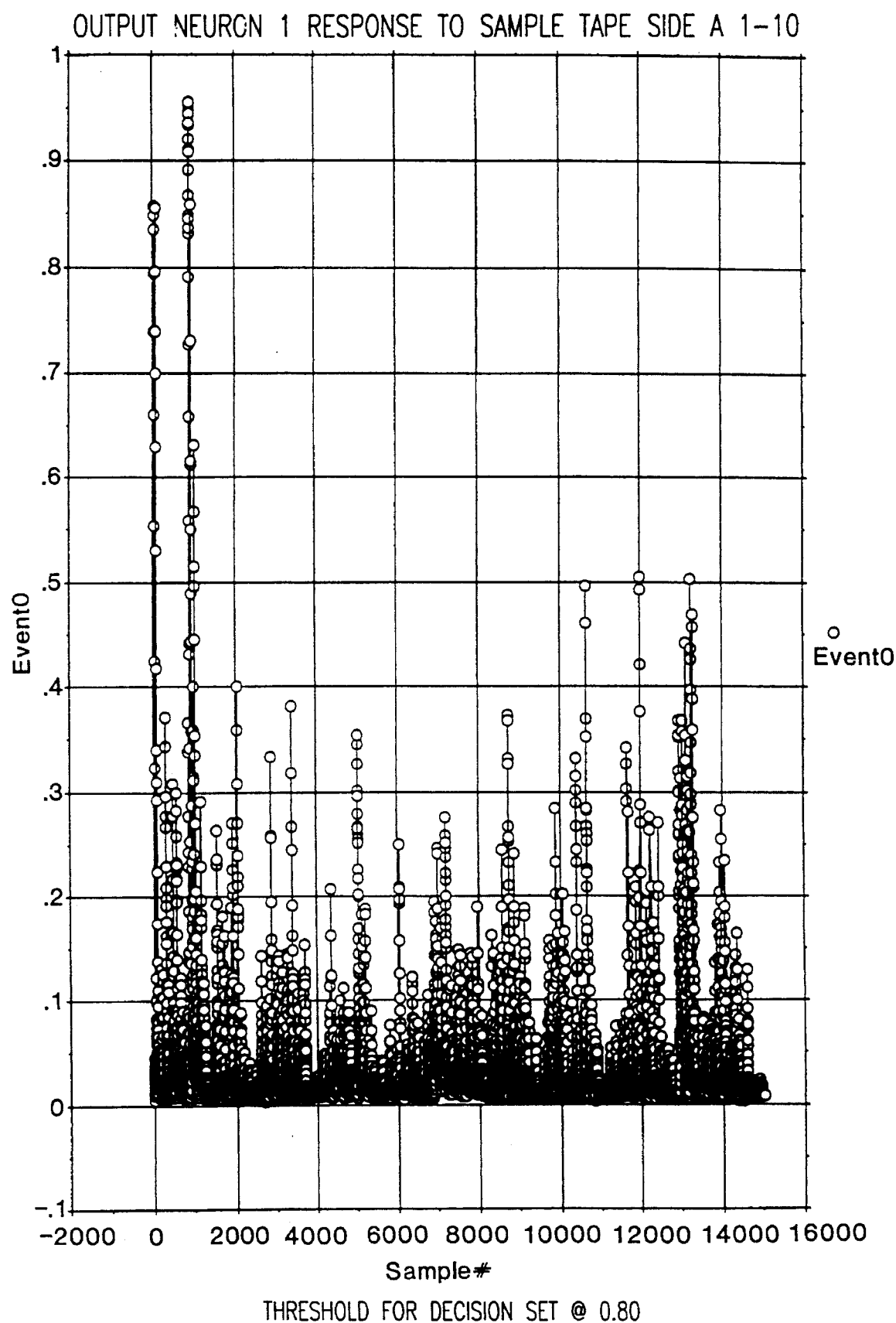
FIGS. 11A, 11B, 11C and 11D provide exemplary identification decision outputs for selected musical work performances using the system from FIG. 7.

Threshold vector ($T_s$) 184 (FIG. 9) is a series of threshold values in the interval (0, 1) that are manually selected upon review of the neural output history recorded during a trial run of a musical work performance. For instance, FIGS. 11A–11D provide an exemplary chart of such a history. FIG. 11A shows the output of the first neuron responsive to events numbered 0–9 in a ten-performance sample tape recording. The sample tape includes ten different musical work performances indexed from 0 through 9. FIG. 11A shows that the first neuron output signal $N_o$ attains values above 0.85 during the performance of the first musical work for which it is trained and never thereafter exceeds 0.55 during the performances of the remaining nine musical works recorded on the sample tape.

Figure 11B:
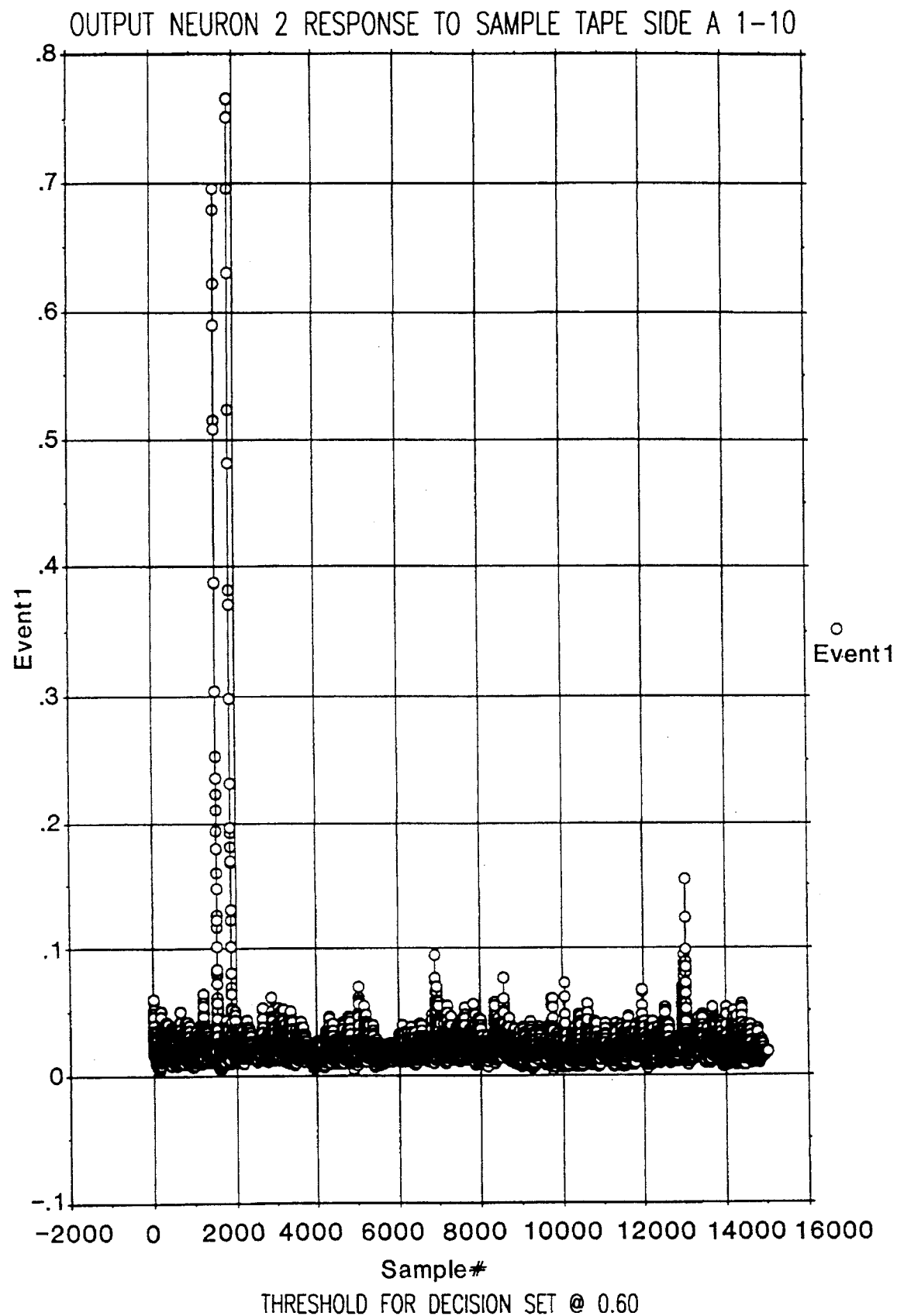
Figure 11C:
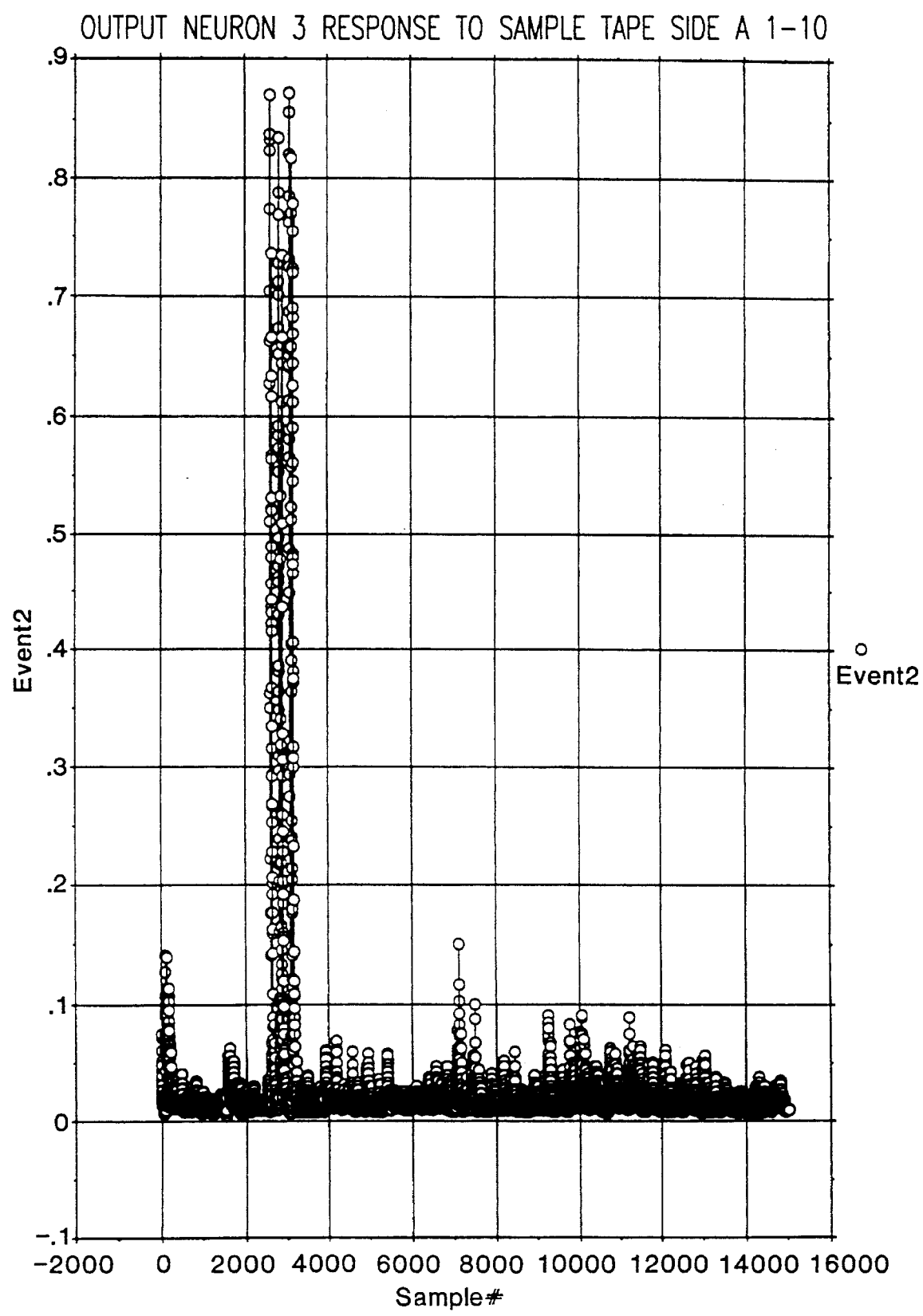
Figure 11D:
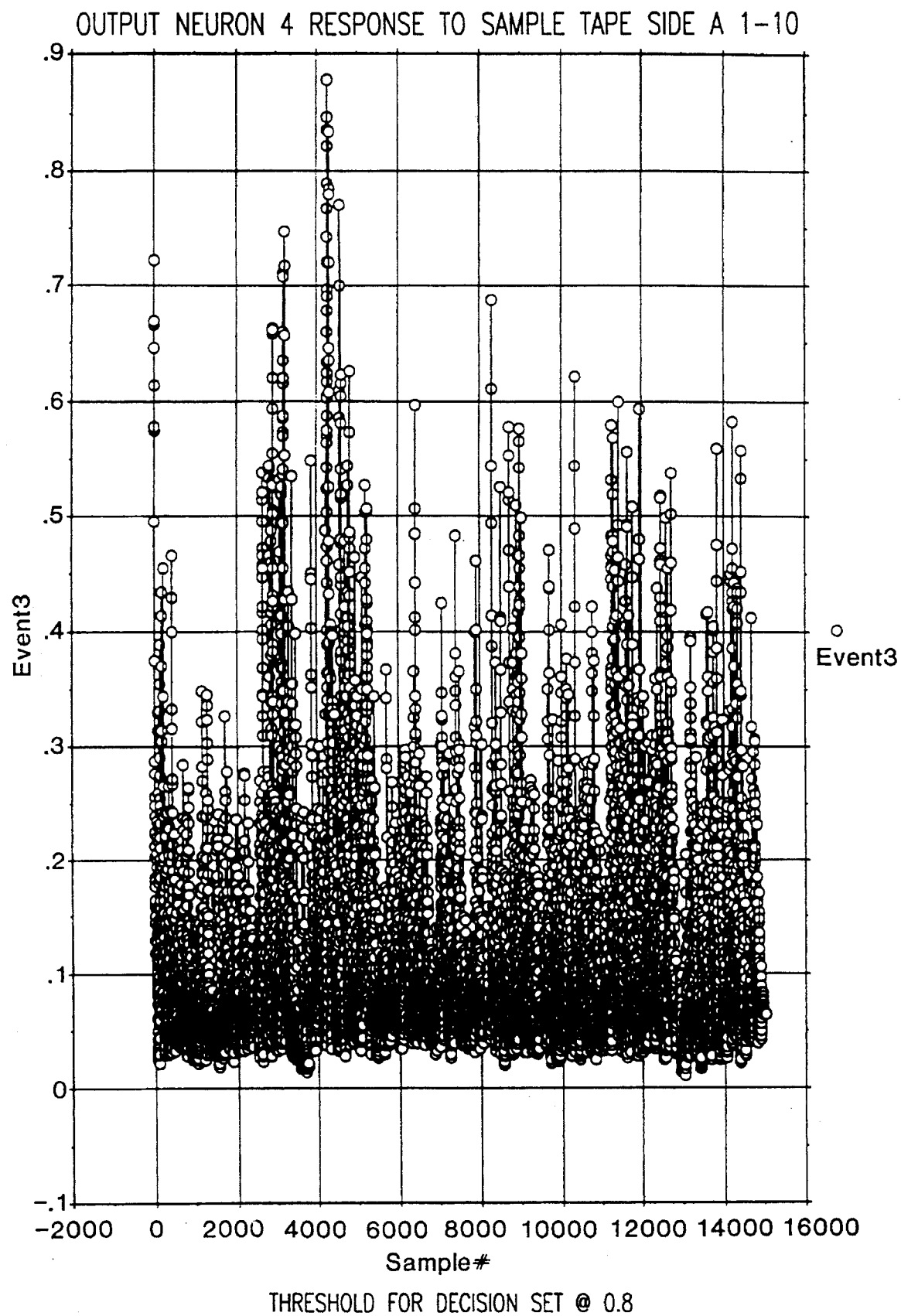

Similarly, in FIG. 11B, the second neural output signal $N_1$ is shown charted over the entire duration of the ten-performance sample tape. The value of $N_1$ exceeds 0.65 during the performance of the second musical work for which it is trained and otherwise never exceeds 0.15. In FIG. 11C, the third neural output signal $N_2$ is shown exceeding 0.80 during the performance of the third musical work for which it is trained and otherwise never exceeding 0.15. Finally, FIG. 11D shows the fourth neural output signal $N_3$, which is very active for most of the musical work performances, commonly exceeding 0.6 and twice exceeding 0.70 during musical work performances other than the fourth work for which it is trained. However, even with this unusual activity level, $N_3$ exceeds 0.85 during the performance of the musical work for which it is trained.

Using statistical charts of output neuron activity, exemplified by FIGS. 11A–11D, the user establishes a threshold value $T_s$ for each musical work performance for which the neural network is trained. This threshold $T_s$ should be established below the peak values observed during the trial runs and above the peaks found over the sample of alternative musical work performances. As an example, consider FIG. 11A. The maximum peak activity for $N_o$ is 0.95, which is unusually high because training is halted at the 0.98 level. A secondary maximum for a different retina within the same musical work performance is found to have a value of 0.87, which is still unusually high. Over the remaining nine musical work performances for which the neuron is not trained, a maximum value of 0.50 is found. Such partial correlation is expected for musical work because of the limited range of complexity seen in contemporary popular music. Using the example of FIG. 11A, the first threshold $T_o$ should be established somewhere between 0.5 and 0.87 to permit reliable recognition of performances of the first musical work without undesired false recognition of performances of other musical works. We suggest establishing a threshold $T_o$=0.8 to provide a false-alarm margin of (0.8–0.5)=30%.

Considering the difficulties exhibited in FIG. 11D where the range between a false alarm indication of 0.75 and the second correct identification indication as 0.87 is arguably too small to be useful, the situation suggests that training of neural network 118 should be continued with the fourth musical work training sample to further refine the neural network weight set governing recognition of performances of the fourth musical work.

Clearly, other embodiments and modifications of our invention will occur readily to those of ordinary skill in the art in view of these teachings. Therefore, our invention is to be limited only by the following claims, which include all such embodiments and modifications when viewed in conjunction with the above specification and the accompanying drawing.

We claim:

1. A computer-implemented method for identifying and reporting an audible performance of a musical work recorded in a medium of fixed expression, said method comprising the steps of:

(a) training a neural network to generate an output signal corresponding to recognition of a selected retinal sample of said audible performance;

(b) receiving an audio signal from a performance broadcast;

(c) processing said audio signal to create a series of overlapping retinal samples of said audible performance, wherein each said retinal sample includes a plurality of digital signals representing a spectral and temporal distribution of power of said audio signal;

(d) generating said neural network output signal responsive to said series of overlapping retinal samples;

(e) comparing each said neural network output signal with a corresponding predetermined threshold signal; and (f) logging a record of the broadcast of said musical work performance responsive to said neural network output signal exceeding said corresponding predetermined threshold signal.

2. The method of claim 1 wherein said retinal samples include selected portions of said audio signal from which invariant features are removed.

3. The method of claim 1 wherein said training step (a) is performed with said selected retinal sample in combination with random noise.

4. A computer-implemented method for identifying an $I^{th}$ one of a plurality S of musical works from a first audio signal $A_{1s}$ representing a first audible performance of a musical work, wherein for each of said plurality S of musical works a set of R weights $(W_r)_s$ is predetermined responsive to a portion $P_{2s}$ spanning a retinal time interval $t_R$ of a second audio signal $A_{2s}$ representing a second audible performance of said each musical work, wherein $1 \leq s \leq S$ and $1 \leq r \leq R$ are non-zero positive integers, said method comprising the steps of:

(a) creating a plurality R of retinal signals $(S_r)$ representing a spectral and temporal distribution of power in a portion $P_{1s}$ of said first audio signal $A_{1s}$ spanning a retinal time interval $t_R$;

(b) combining said retinal signals $(S_r)$ with each of a plurality S of weight sets $(W_r)_s$ to create a plurality S of neural output signals $(N_s)$ each representing a weighted combination of said retinal signals $(S_r)$;

(c) creating a plurality S of ratio signals $(N_s/T_s)$ each corresponding to the ratio of each of said neural output signals $(N_s)$ to a corresponding predetermined alarm threshold signal $T_s$;

(d) if at least one of said ratio signals $(N_s/T_s)$ exceeds unity, selecting an $I^{th}$ neural output signal $N_I=N_s$ corresponding to a greatest said ratio signal $N_s/T_s$ of said plurality S of ratio signals $(N_s/T_s)$, whereby said neural output signal $N_I$ represents an identity of said $I^{th}$ musical work, otherwise selecting nothing;

(e) making an alarm log record responsive to said selection of said neural output signal $N_I$, said alarm log record including an alarm date, an alarm time, and the identity of said $I^{th}$ musical work; and (f) repeating said steps (a)–(f) responsive to a passage of an updating time interval $t_U < t_R$.

5. The method of claim 4 wherein said creating a plurality of R of retinal signals (Sr) comprises the steps of:

creating a plurality of first digital signals representing amplitude samples of said first audio signal portion $P_{1s}$;

combining said first digital signals to create a set of second digital signals representing the Fourier Transform of said first digital signals spanning a predetermined frequency region; and accumulating one or more said set of second digital signals to form said plurality R of retinal signals $(S_r)$.

6. The method of claim 5 wherein said each weight set $(w_r)_s$ is determined responsive to said second audio signal portion $P_{2s}$ in combination with a random noise signal.

7. The method of claim 6 wherein each of said neural output signals ($N_s$) is exponentially smoothed by combining said each of said neural output signals ($N_s$) with a weighted combination of one or more earlier values of neural output signals ($N_s$) to create a smoothed neural output signal $\hat{N}_s$.

8. The method of claim 7 wherein said first audible performance of said each musical work is included in a broadcast program.

9. The method of claim 4 wherein said first and second audible performances of said each musical work are the same performance recorded in a medium of fixed expression.

10. The method of claim 9 wherein said first audible performance of said each musical work is included in a broadcast program.

11. A system for identifying and logging a broadcast of an audible performance of a musical work recorded in a medium of fixed expression, said system comprising:

input means for receiving an audio signal from a performance broadcast;

processing means coupled to said input means for creating a series of overlapping retinal samples of audio signal, wherein each said retinal sample includes a plurality of digital signals representing a spectral and temporal distribution of power of said audio signal power;

neural network means coupled to said processing means for creating a neural output signal representing a recognition of said each retinal sample;

training means coupled to said neural network means for training said neural network means to generate said neural output signal corresponding to recognition of a selected retinal sample of said audible performance; and logging means for storing a record of a recognition of said broadcast of said musical work performance responsive to each said neural output signal in excess of a predetermined threshold signal.

12. The system of claim 11 wherein said retinal samples include selected portions of said audio signal from which invariant features are removed.

13. The system of claim 11 wherein said training means further comprises:

noise biasing means for adding random noise to said selected retinal sample of said audible performance during said training of said neural network means.

* * * * *